Oct. 9, 1973   G. E. ROWE   3,764,284
METHOD AND APPARATUS FOR TREATING NEWLY FORMED WARE
Filed Dec. 20, 1971   4 Sheets-Sheet 1
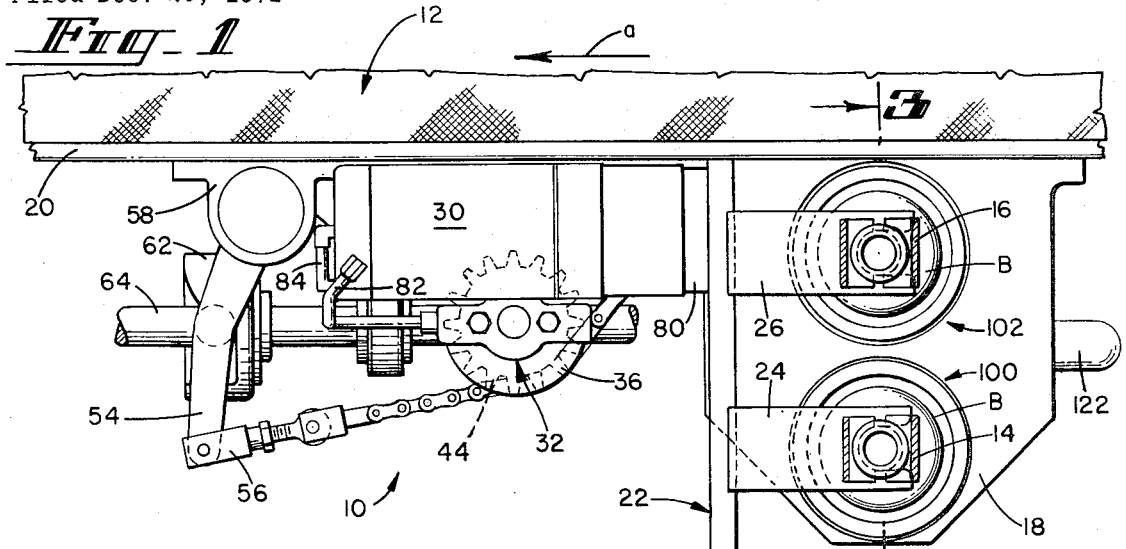
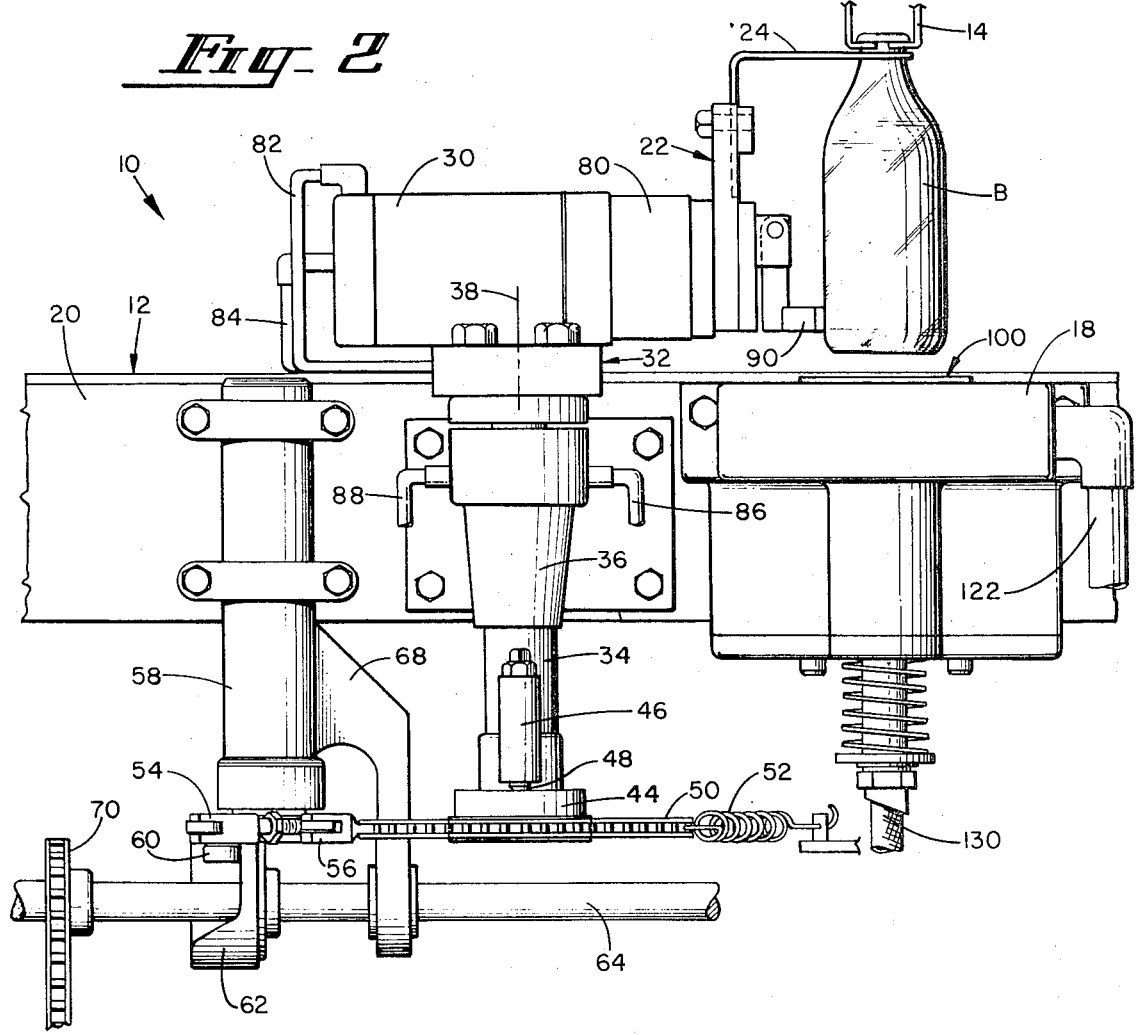

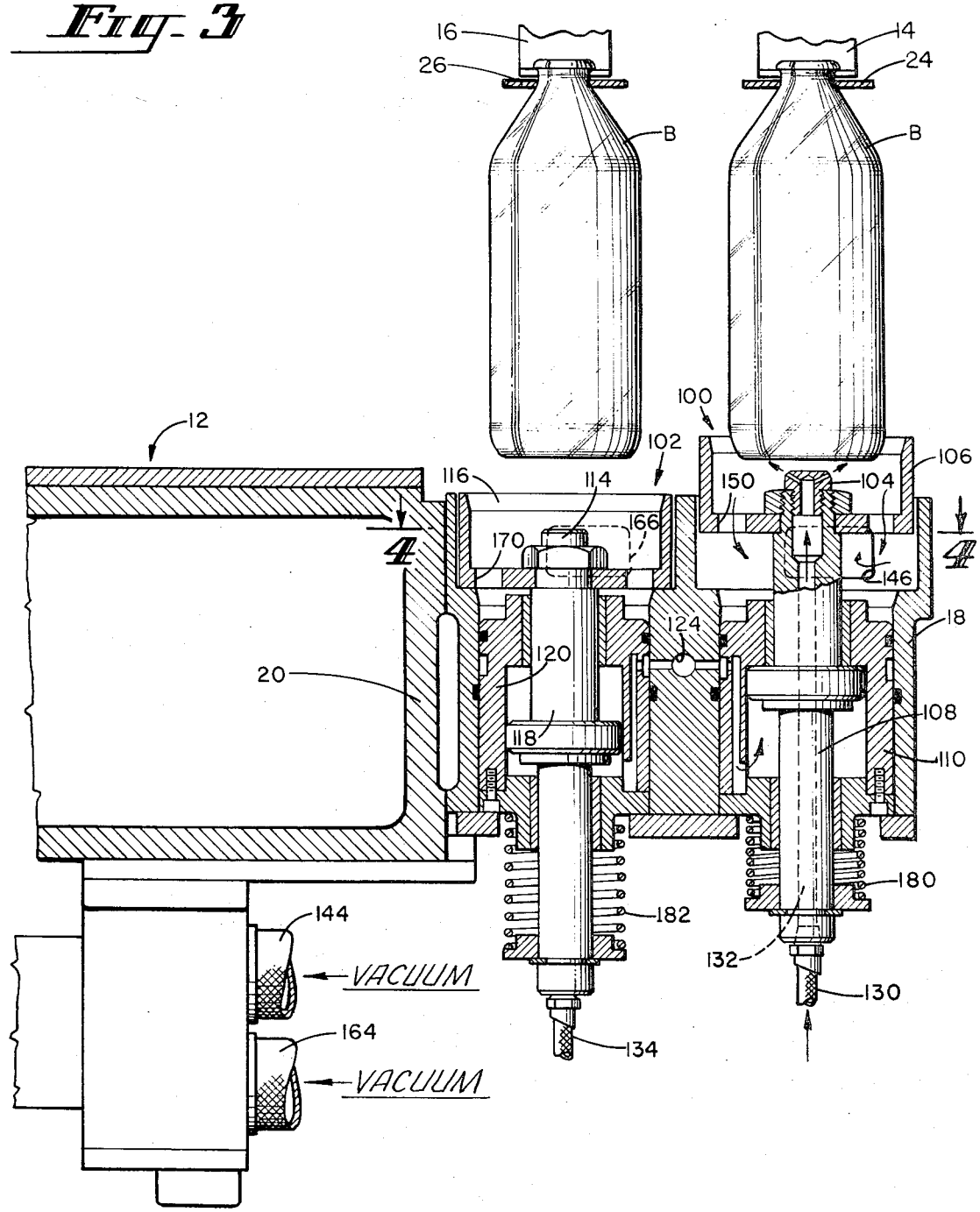

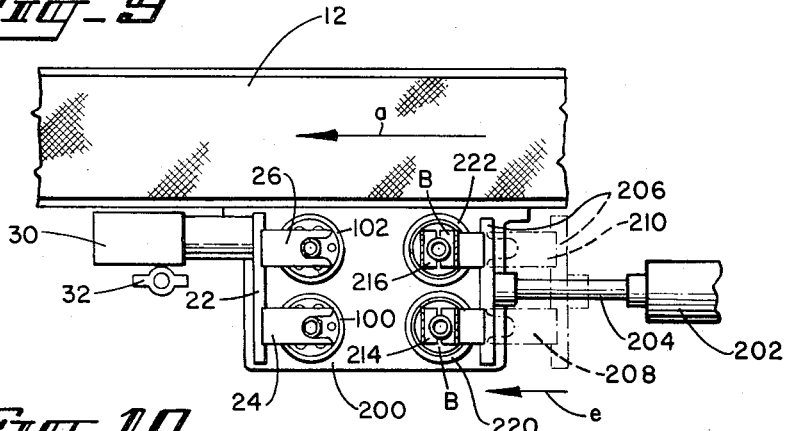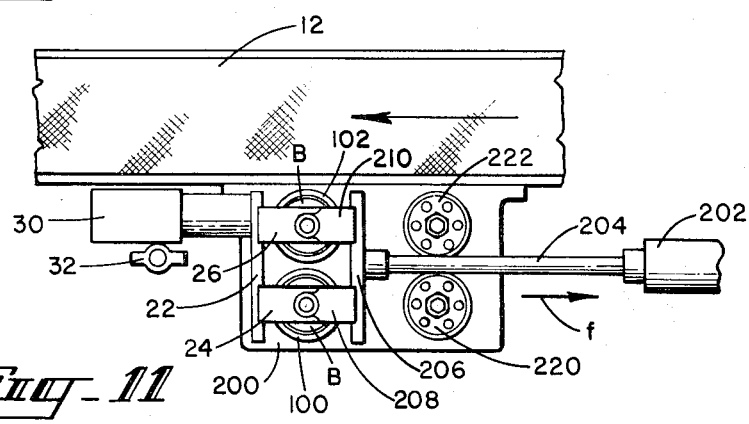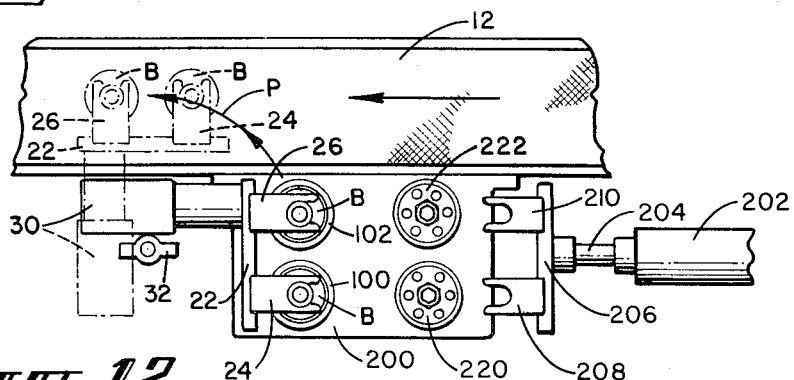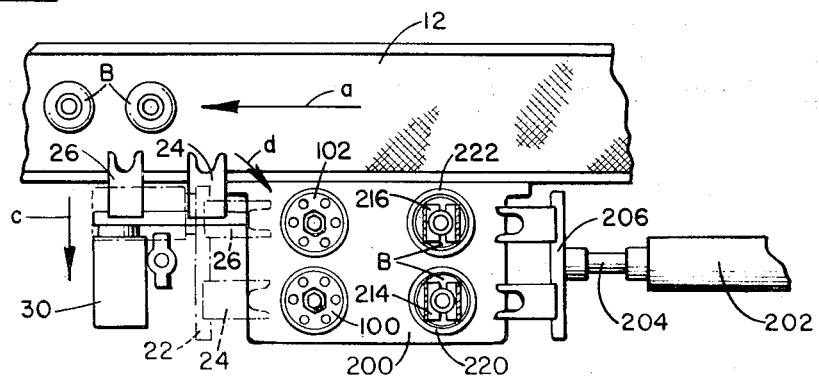

United States Patent Office 3,764,284
Patented Oct. 9, 1973

3,764,284
METHOD AND APPARATUS FOR TREATING NEWLY FORMED WARE
George E. Rowe, Wethersfield, Conn., assignor to Emhart Corporation, Bloomfield, Conn.
Filed Dec. 20, 1971, Ser. No. 209,736
Int. Cl. C03c 17/00; C03b 9/44
U.S. Cl. 65—60
18 Claims

ABSTRACT OF THE DISCLOSURE

A method and apparatus for treating newly formed glassware as the ware is removed from a forming machine utilizing a transfer mechanism which holds the glassware in a suspended condition until the ware is deposited on an output conveyor. The transfer mechanism moves the ware in the suspended condition over a spray head which consists of a spray cup which periodically moves upwardly to surround the bottom of the glassware to expose the base of the ware to a timed cooling and metal chloride spray. The newly formed ware is maintained in its suspended condition until it is deposited on the conveyor to prevent distortion of the ware and bottom checking and the timed spray assists in strengthening the glass and building up a resistance to bottom checking before the newly formed ware first rests under its own weight outside of the mold of the forming machine.

BACKGROUND OF THE INVENTION

The present invention relates to the field of glassware forming equipment and the like and, more particularly, is concerned with the method and apparatus for treating newly formed ware before it is set on a surface under its own weight.

Glassware forming machines which have received wide acceptance in the glass industry utilize a forming machine composed of several individual sections, I.S. machines, each section of which is capable of producing one or more fully formed articles of ware in a cyclic operation. Generally, each machine section is positioned adjacent a common output conveyor and the sections are operated in timed relationship with one another so that a series of articles is deposited on the output conveyor during each cycle of operation of the machine. The output conveyor generally leads to a lehr through which each series of articles passes for annealing. A forming machine of this type is shown and described in U.S. Pat. 1,911,119 to Ingle to which reference may be had for further understanding of the present invention.

In the glassware forming machines of the prior art, the newly formed ware is removed from a mold and deposited on a deadplate between the machine section and the output conveyor. A pusher mechanism operating in timed relationship with each of the pusher mechanisms of the other machine sections sweeps the newly formed ware off of the deadplate and into a series of such ware articles on the output conveyor. U.S. Pats. 3,249,200, 3,249,201, and 3,318,433 assigned to the assignee of the present invention all disclose pusher mechanisms of this type.

Since the newly formed ware is not completely hardened or annealed when it is removed from a forming machine, it is possible for the ware, particularly a bottle, to deform under its own weight or to become checked or marred when it is first set down on the deadplate and subsequently swept onto the output conveyor. To resist bottom checking and improve the strength of the ware, it is customary to provide perforated deadplates and to direct a blast of cooling air upwardly through the perforated deadplates and over the ware as it is set down for the first time. Apparatus providing such cooling is shown and described in U.S. Pat. 2,556,469 having the same assignee as the present invention. Due to the limited time associated with the removal of the newly formed ware from the forming machine and the setting of the ware on the deadplate, bottom checking and deformation of the ware are still possible.

It is accordingly a general object of the present invention to disclose a method and apparatus for handling and treating newly formed glassware between a forming machine and an output conveyor which receives and translates the ware resting under its own weight.

SUMMARY OF THE INVENTION

The present invention resides in a method and apparatus for handling and treating newly formed articles while the articles are moved from a forming machine toward an output conveyor.

The apparatus which operates in accordance with the method of the present invention utilizes a carrier means that is engageable with and disengageable from the newly formed article and holds the article while engaged in a suspended condition exposing a base portion of the article. Transfer means are connected to the carrier means for moving the carrier means and the engaged article along a path from a first position adjacent the forming machine to a second position over the conveyor on which the article is to be deposited. Fluid dispensing means having a fluid dispensing head are located adjacent the path from the first to the second position and the head is directed toward the path so that the exposed base portion of the engaged article can be treated with the fluid dispensed by the head as the article moves toward the conveyor. The dispensing head in one form is a spray head which includes a cup that directs a cooling fluid or a metallic chloride spray against the base of the article. Scavenging means surrounding the spray head are utilized to remove noxious or objectionable gases and vapors formed during the spraying operation.

By maintaining the article in the suspended condition between the forming machine and the output conveyor and spraying the base of the article with a treatment fluid, increased strength and resistance to bottom checking can be imparted to the article before it is first rested on a surface under its own weight.

BRIEF DESCRIPTION OF THE DRAWINGS

FIG. 1 is a plan view of a handling and treating apparatus embodying the present invention and located adjacent an output conveyor on which two glass bottles are about to be deposited.

FIG. 2 is a side elevation view of the apparatus in FIG. 1.

FIG. 3 is a sectional view of the handling and treating apparatus as seen along the sectioning line 3—3 of FIG. 1.

FIGS. 9–12 are plan views of another embodiment of the handling and treating apparatus and also show the positions of the various components in a complete cycle of operation.

DESCRIPTION OF THE PREFERRED EMBODIMENTS

Figure 4:
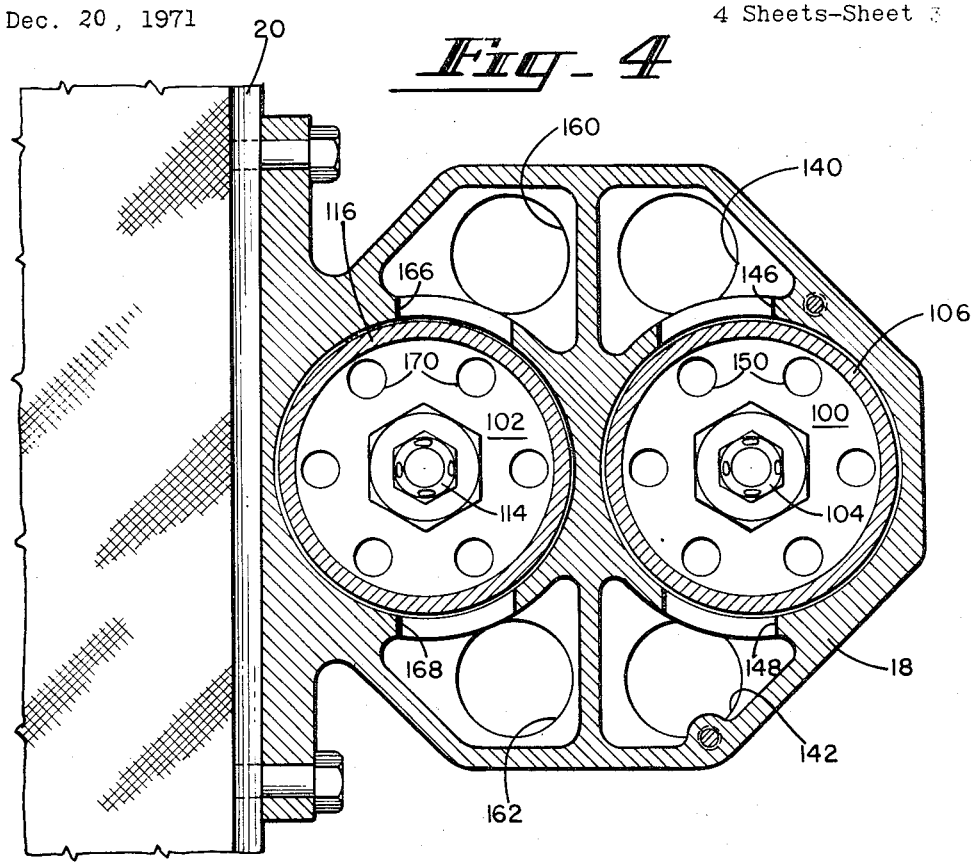
FIG. 4 is a partially sectioned view of the spray heads and conveyor as seen along the sectioning line 4—4 of FIG. 3.

FIGS. 1 and 2 are views of the handling and treating apparatus of the present invention in one embodiment. The apparatus, generally designated 10, is disposed between a glassware forming machine or the like and a continuously moving output conveyor 12 on which the newly formed articles are to be deposited for movement to the left as indicated by the arrow a. The glassware forming machine is of a type known as a double gob I.S. (individual section) machine in which each machine section produces a pair of articles, specifically, the pair of bottles B, during each cycle of operation. Although the invention is disclosed in conjunction with and is particularly suited to operate with a bottle forming machine, it is not so limited and may be employed with other forming machines in which it is advantageous to treat newly formed articles as the articles are removed from the machine.

Each section of the double gob machine has two pairs of take-out jaws 14 and 16 which remove the bottles B from a blow mold after the bottles have been expanded to the illustrated final configuration. The take-out jaws 14 and 16 remove the bottles B from the forming molds by engaging the beads at the necks of the bottles and lifting the bottles from the molds. The bottles are then swung to pickup positions immediately above the stationary platform or deadplate 18 which is secured to the side of the frame 20 of the conveyor 12. While the bottles are held in a suspended condition above the deadplate, a carrier 22 having two neck ring support arms 24 and 26 is brought into engagement with the bottles. The forked and projecting ends of the arms 24 and 26 are slipped under the take-out jaws 14 and 16 respectively as seen most clearly in FIG. 2 and then the jaws release the bottles.

Figure 7:
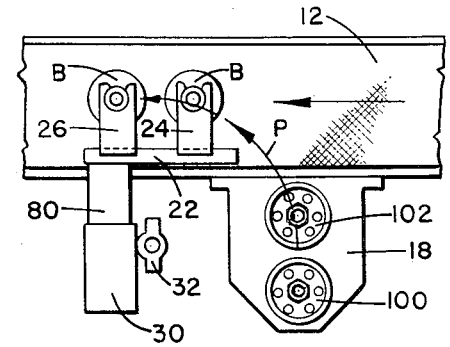
Figure 8:
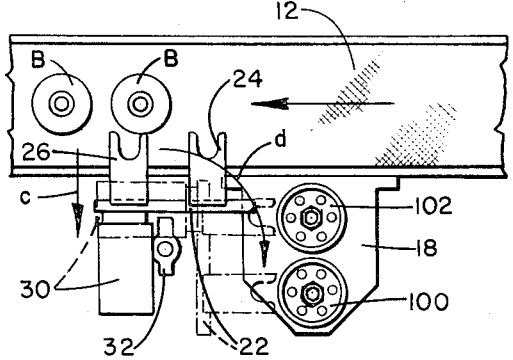

The carrier 22 is connected to a rotatable transfer mechanism comprised of a fluid motor 30 and a rotatable motor mount 32 which includes a pivot shaft 34 mounted in a journal bearing 36 secured to the frame 20 of the conveyor and having a vertical pivot axis 38 arranged perpendicularly to the generally horizontal plane in which the upper surface of the conveyor 12 moves. A drive sprocket 44 is freely rotated on the lower end of the pivot shaft 34 and is connected in driving relationship with the shaft 34 by means of an adjustable, spring-loaded detent 46 secured to the shaft and having a detent ball 48 engaging a matching recess in the sprocket 44. A drive chain 50 anchored at one end to the frame of the conveyor 12 by a tensioning spring 52 is trained over the drive sprocket 44 and connects to a rocker arm 54 by means of a coupling 56. The rocker arm 54 is pivotally mounted in a journal housing 58 for rocking movement about a vertical axis and the arm 54 includes a cam follower 60 which engages a cam 62 on a drive shaft 64. The drive shaft 64 is supported in a bracket 68 and is driven from the forming machine by means of the chain and sprocket 70. The rotation of drive shaft 64 and, therefore, the cam 62 is synchronized by the chain and sprocket 70 with the operation of the forming machine so that the cam 62 makes one complete rotation during each operating cycle of the forming machine section. One portion of the profile of the cam 62 is designed to allow the tensioning spring 52 and chain 50 to drive the sprocket 44 in one direction and to pivot shaft 34 and motor mount 32 together with the fluid motor 30 through an angle slightly larger than 90° so that the bottles B engaged by the carrier 22 are transferred from the pickup positions above the deadplate 18 to discharging positions directly over the conveyor 12 (as shown in FIG. 7). The tangential speed of the carrier 22 and the bottles produced at the discharging positions by the profile of cam 62 is matched with the translational speed of the conveyor 12 so that the bottles do not topple as they are deposited on the conveyor. A second portion of the cam profile pulls the chain 50 and rotates the motor mount 32 and the motor 30 in the reverse direction to return the carrier 22 to the pickup position over the deadplate 18. The detent 46 disengages the sprocket 44 and the pivot shaft 34 in the event that the motor 30 or the carrier 22 becomes jammed or is otherwise prevented from rotating under the driving forces of the spring 52 or the cam 62.

To engage the bottles B at the pickup positions and disengage the bottles at the discharging positions over the conveyor 12, the fluid motor 30 includes a reciprocating operating rod 80 that projects from the right-hand end of the motor as viewed in FIGS. 1 and 2. In the embodiment shown in FIGS. 1 and 2, the fluid motor 30 is an air-operated piston and cylinder assembly in which the operating rod 80 is the piston rod. The rod 80 is reciprocated axially or in a direction parallel to the upper surface of the conveyor 12 by controlling the flow of air through two control lines 82 and 84 connected to the housing of the motor 30. The control lines 82 and 84 lead to the rotatable motor mount 32 and are connected through conduits (not shown) within the pivot shaft 34 and through the journal bearing 36 to an air supply line 86 and an air exhaust line 88 connected to the bearing 36. Within the journal bearing 36 are ports which communicate with the conduits in shaft 34. The ports are arranged between the shaft 34 and journal bearing 36 so that the flow of air through the control lines 82 and 84 causes the operating rod 80 to be held or moved toward its extended position shown in FIGS. 1 and 2 whenever the carrier 22 is rotated to face the pickup positions over the deadplate 18 and to cause the rod 80 to be held or moved toward its retracted position when the carrier 22 is rotated to face the discharging positions over the conveyor 12. The retraction of the rod 80 at the discharging position occurs very rapidly so that the support arms 24 and 26 disengage themselves from the beads of the bottles and allow the bottles to drop the short distance onto the upper, moving surface of the conveyor 12. To assist in the disengagement of the bottles from the support arms 24 and 26, inertial knockers 90 (only one visible) are penduously supported from the carrier 22 for freely pivoting movement adjacent the respective bottles. As the operating rod 80 is rapidly retracted over the conveyor 12, the inertial forces operating on the knockers 90 urge the knockers against the bottles, if the bottles attempt to follow the retracting movement of the support arms 24 and 26, and dislodge the bottles from the support arms.

It is of special significance with respect to the present invention that the bottles B are maintained in a pendular condition above the deadplate 18 after being removed from the forming machine section for the purpose of being exposed to a cooling and treating fluid on its base or lower portion. For the purposes of description and interpretation hereinafter, a reference to the base or lower portion of the ware is intended to refer to that part of the newly formed ware on which the ware is rested after being removed from a forming machine and the upper portion is that part of the newly formed ware above the lower portion.

To expose the bottles B to the treatment fluid, a pair of fluid dispensing spray heads 100 and 102 shown most clearly in FIGS. 3 and 4 are mounted in the deadplate 18 immediately below the pickup positions for the respective bottles. The spray head 100 is comprised of a multi-orifice nozzle 104 directed toward the base of the bottle and a spray cup 106 mounted concentrically about the nozzle and having a cylindrical configuration conforming to the base portion of the bottle B. The spray head 100 is mounted on the upper end of a reciprocating piston rod 108 which together with a cylinder 110 forms a reciprocating fluid motor for shifting the spray head 100 vertically toward and away from the exposed base portion of the bottle held by the neck ring support arm 24. In the same manner, the spray head 102 is comprised of a multi-orifice nozzle 114 and a spray cup 116 mounted concentrically about the nozzle and on the upper end of a reciprocating piston rod 118 which in conjunction with a cylinder 120 forms a reciprocating fluid motor for moving the spray head 102 toward and away from the exposed base portion of the bottle held in the neck ring support arms 26.

The piston rods 108 and 118 are shown in the extended and retracted positions respectively for the purpose of illustration only and the rods are actually operated together by introducing pressurized air through the supply line 122 (FIG. 1 and 2) and a fluid conduit 124 within the deadplate 18 to the lower ends of the cylinders 110 and 120. Each of the cylinders 110 and 120 directs the pressurized air from the conduit 124 to the lower side of the pistons on the rods 108 and 118 to urge the spray heads 100 and 102 upwardly toward the bottles. A control valve (not shown) on the forming machine introduces the pressurized air to the cylinders 110 and 120 at the time in the forming machine operating cycle when the bottles are moved into the pickup positions by the take-out jaws 14 and 16. As the spray cups 106 and 116 are moved up to a position partially enveloping the bases of the bottles, a treating fluid is delivered from the machine section through a hose 130 and a central bore 132 within the piston rod 108 and is dispensed through the nozzle 104 in a finely atomized spray against the base of the bottle within the cup. Correspondingly, a treating fluid is supplied from the forming machine section through a hose 134 and a bore within the piston rod 118 so that the fluid is dispensed through the nozzle 114 against the base of the bottle above the spray cup 116. The control cam 62 (FIGS. 1 and 2) ensures that the neck ring support arms 24 and 26 hold the bottles stationary while the spray cups 106 and 116 are extended and partially enveloping the bases of the bottles. The cups 106 and 116 ensure that the spray is directed toward and around the bases of the bottles and limit the amount of spray which escapes through the annular openings between the cups and the bottles.

The treating fluid is preferably a metal chloride such as stannous chloride or ferric chloide which is known to provide increased strength and hardness in glassware. In addition to improving the strength of the bottles, the fluid also has a cooling effect which contributes to a more rapid setting of the newly formed glass in the base of the bottle. With a stronger and harder base portion, the bottles are more capable of resisting bottom checking when they are first deposited on the upper surface of the output conveyor and the bottles in their finished form will more accurately resemble their initial configuration generated within the molds of the forming machine.

Since the spraying operation, particularly with a metal chloride spray, often generates objectionable or noxious fumes, a fluid scavenging mechanism is incorporated within the deadplate 18 to absorb or recover some of the fumes. The scavenging mechanism includes two vacuum manifolds 140 and 142 in the deadplate 18 which are interconnected and joined to a vacuum conduit 144 below the conveyor frame 20. The manifolds 140 and 142 also communicate with the lower side of the spray cup 106 through lateral ports 146 and 148 adjacent the cup when the cup is elevated as shown out of contact with its annular seat in the deadplate and exposes the ports. The spray cup 106 has a plurality of scavenging apertures 150 so that fumes or gases produced around the base of the bottle exposed to the treating fluid are sucked downwardly through the cup 106 as indicated by the arrows and into the vacuum manifolds 140 and 142. The removal of the fumes from the working area improves the working conditions for personnel involved with the glass forming operation. In a similar manner, the manifolds 160 and 162 in the deadplate are connected to the vacuum conduit 164 and communicate with the interior of the spray cup 116 through ports 166 and 168 in the deadplate and apertures 170 in the base of the cup. The downdraft produced by the vacuum manifolds additionally cools the lower portion of the bottles.

When the spraying operation is completed, the pressurized air within the cylinders 110 and 120 is vented through the air line 122 (FIG. 1) and retraction springs 180 and 182 mounted concentrically about the respective piston rods 108 and 118 pull the spray heads 100 and 102 downwardly into the deadplate 18 until the upper edges of the cups 106 and 116 are slightly below the upper surface of the conveyor 12 as shown by the cup 116 in FIG. 3 and the lower sides of the cups are seated in the deadplate to cut off the vacuum manifolds. In this position, the bottles suspended in the neck ring support arms 24 and 26 are spaced vertically from the spray heads 100 and 102 and are free to move in a lateral direction from the spraying position to the discharge position on the upper surface of the conveyor 12.

Figure 5:
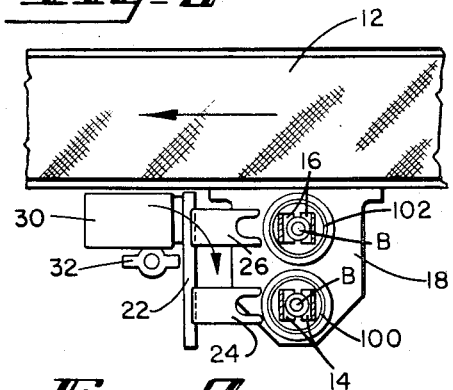
FIGS. 5–8 are plan views of the handling and treating apparatus and show the various positions of the apparatus during one complete cycle of operation in which the two articles are moved from a forming machine onto an output conveyor.
Figure 6:
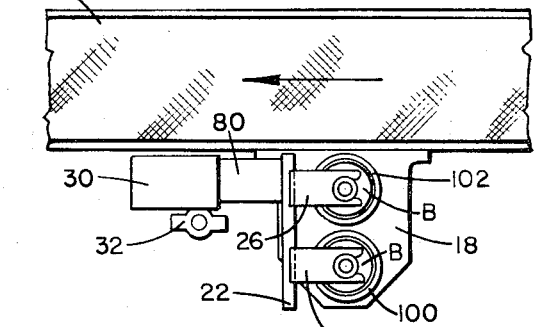

FIGS. 5–8 show the various positions assumed by the bottles B as they are removed from a forming machine section and deposited on the continuously moving output conveyor in accordance with the present invention. In FIG. 5, after being removed from the forming machine section, the bottles B are suspended in the take-out jaws 14 and 16 over the spray heads 100 and 102 in a pendular condition. As the carrier 22 and fluid motor 30 are rotated by the mount 32 into the position indicated with the neck ring support arms 24 and 26 aligned with the bottles, the piston rod 80 extends and the support arms 24 and 26 engage the necks of the bottles at the pickup position as shown in FIG. 6. The take-out jaws 14 and 16 then release the bottles engaged by the arms. The control cam 62 (FIG. 1) then permits the drive chain 50 and sprocket 44 to rotate the pivot shaft 34 and rotatable mount 32 to swing the bottles from the pickup position in an accurate path P over the deadplate 18 through an angle of approximately 90° toward the discharge position over the conveyor 12 as shown in FIG. 7. As the carrier 22 reaches the discharge position shown in FIG. 7, the speed of the bottles at the extended position of the rod 80 is substantially equal to the translational speed of the conveyor 12. The rotation of the mount 32 into the discharge position shown is also accompanied by a rapid retraction of the piston rod 80 and the depositing of the bottles B on the conveyor through the assistance of the knockers 90 at the bases of the bottles. With the neck ring support arms 24 and 26 retracted away from the necks of the bottles in the direction of the arrow c in FIG. 8, the bottles are free to move with the conveyor 12 without further interference by the support arms. The cam 62 (FIG. 1) then causes the rotatable mount 32 to return the carrier 22 in the direction of the arrow d to a position adjacent the pickup position on the deadplate 18 as indicated in phantom in FIG. 8. If desired, a stripper bar can be added to the mount 32 to insure that the bottles disengage themselves from the neck ring support arms 24 and 26 at the discharge position over the conveyor 12; however, testing has indicated that such a bar is not necessary.

FIGS. 9–12 show another embodiment of the invention in which the bottles B after removal from the molds of the forming machine are subjected to two separate sprays at different positions over a deadplate 200. In this embodiment of the invention, the rotatable platform 32 together with the carrier 22, fluid motor 30 and the spray heads 100 and 102 take the same form as that shown in FIGS. 1–8. In addition, however, another fluid motor 202 including an extendible piston rod 204 is mounted adjacent the deadplate 200 to reciprocate the rod 204 axially over the deadplate. A carrier 206 similar in construction to the carrier 22 includes two neck ring support arms 208 and 210 and is mounted to the end of the piston rod 204.

The take-out jaws 214 and 216 remove the bottles B from the forming machine section and suspend the bottles in a pendular condition over two additional spray heads 220 and 222 mounted in the deadplate 200. The spray heads 220 and 222 have the same construction and operate in the same manner, but at a different time, as the spray heads 100 and 102 at the opposite side of the deadplate. As the take out jaws 214 and 216 lower the bottles B into a pickup position over the spray heads 220 and 222, the fluid motor 202 is actuated to partially extend the rod 204 in the direction of the arrow e until the neck ring support arms 208 and 210 move from the phantom position and engage the necks of the bottles. During the engagement of the bottles, the spray heads 220 and 222 are elevated toward the base portions of the bottles and are actuated to apply a treating fluid for coating or otherwise treating the base portions of the bottles. The treating fluid may be the same fluid employed by the spray heads 100 and 102 or a different fluid depending on the type of treatment or coating desired. After the fluid has been applied, the spray heads 220 and 222 are retracted into the deadplate 200 and the bottles are maintained suspended in the support arms 208 and 210 spaced above the spray heads and the deadplate 200.

After the treatment of the bottles B over the spray heads 220 and 222, the piston rod 204 of the motor 202 is further extended in the direction of the arrow e to transfer the carrier 206 with the bottles over the deadplate 200 to a position immediately above the spray heads 100 and 102 as shown in FIG. 10. By tapering the engaging forks of the neck ring support arms 24 26, 208 and 210 and positioning the arms 24 and 26 immediately above the arms 208 and 210, the arms 24 and 26 slide over the arms 208 and 210 respectively and lift the bottles out of engagement with the arms 208 and 210 as the bottles move into the pickup position over the spray heads 100 and 102. The piston rod 204 together with the carrier 206 is then retracted in the direction of the arrow f in FIG. 10 until it assumes the position shown in FIG. 11. At the same time, another spraying operation is carried out by the heads 100 and 102 in the same manner as described above with respect to FIGS. 1–6.

After the second spraying operation and with the bottles B suspended in a pendular condition in the neck ring support arms 24 and 26, the actuating cam 62 (FIG. 1) then sweeps the carrier 22 over the arcuate path P to the discharge position shown in phantom in FIG. 11 over the conveyor 12 and rapid retraction of the carrier deposits the bottles on the conveyor as described above and as shown in FIG. 12. The carrier 22 is then rotated toward the phantom position shown adjacent the deadplate 200 and subsequently extended over the spray heads 100 and 102. At the same time, the take-out jaws 214 and 216 remove the next pair of newly formed bottles B from the forming machine section and the cycle of operations is repeated.

While the present invention has been disclosed in several preferred embodiments, it should be understood that various modifications and substitutions can be had without departing from the spirit of the invention. For example, the particular form of the neck ring support arms may be varied to engage a different portion of the bottle or to engage articles which do not have beads that can be conveniently engaged by forked arms disclosed. It is desirable, that the arms be adapted to maintain the articles suspended in the pendular condition as they are removed from the take-out jaws of the forming machine and deposited on the moving surface of the conveyor. The particular form of the fluid motor 30 and the rotatable mount which performs the transferring operation can also be varied. The spray heads 100 and 102 may be utilized with treating fluids that either change the glass structure or form a coating on the glass in order to add strength and increased resistance to bottom checking before the articles are intially deposited on the conveyor under their own weight. Of course, although the embodiments of the invention disclosed are specifically designed for a double gob forming machine, single gob or triple gob configurations are also contemplated. Accordingly, the present invention has been described in several preferred embodiments by way of illustration rather than limitation.

I claim:

1. Apparatus for treating a newly formed article while moving the article from a forming machine toward a conveyor comprising: carrier means engageable with and disengageable from the newly formed article for holding the article in a suspended condition and exposing a base portion of the article; transfer means connected to the carrier means for moving the carrier means and the engaged article along a path from a first position adjacent the forming machine to a second position over the conveyor; motor means mounted adjacent the path between the first and second positions and having a cyclically driven output member movable toward and away from a third position adjacent the path below the exposed base portion of the article in the suspended condition; and fluid dispensing means having a fluid dispensing head supported on the output member of the motor means for movement with the member toward and away from the third position, the head being held on the output member at the third position with an orientation directing fluid from the head toward the exposed base portion of the article for treating the article with a fluid dispensed by the head.

2. Apparatus for treating as defined in claim 1 wherein: the dispensing means comprises spraying means for spraying a fluid against the exposed base portion of the article and the fluid dispensing head is a spray head having a nozzle aimed toward the path at the third position.

3. Apparatus for treating as defined in claim 1 wherein the motor means includes a reciprocating motor having the cyclically driven output member reciprocable toward and away from the path.

4. Apparatus as defined in claim 3 wherein: a cup conforming in shape to the exposed base portion of the article is also mounted to the output member and the fluid dispensing head is located centrally within the cup.

5. Apparatus for treating as defined in claim 1 further including fluid scavenging means also located adjacent the path from the first to the second position and in the vicinity of the fluid dispensing head for capturing dispensed fluid and other fluid products produced by the treatment of the exposed article.

6. Apparatus as defined in claim 5 wherein the fluid scavenging means includes a fluid conduit connected to the dispensing means and forming a scavenging port adjacent the fluid dispensing head.

7. Apparatus for treating as defined in claim 1 wherein the transfer means comprises a fluid motor having a reciprocating output member, the carrier means being connected to the output member; and a rotatable motor mounting supporting the fluid motor and rotatable about an axis to move the carrier and engaged article from the first to the second position.

8. Apparatus as defined in claim 7 further including motor control means connected to the fluid motor for extending the reciprocating output member and the carrier means to engage the article at the first position and for retracting the output member and carrier means to disengage the article at the second position over the conveyor.

9. Apparatus as defined in claim 1 for treating newly formed bottles wherein the carrier means includes a neck ring support arm.

10. Apparatus for treating a newly formed article as defined in claim 1 wherein: a plurality of the fluid dispensing heads and a corresponding plurality of the motor means are located at spaced stations along the path from the first to the second position for a plurality of treatments of the newly formed article.

11. Apparatus for treating a newly formed article as defined in claim 10 wherein: the carrier means comprises two support arms, each arm being engageable with the newly formed article; and the transfer means comprises a first transfer motor having a driving output connected with one of the two support arms for moving the article in the one support arm along the path from the one station to the other station and a second transfer motor having a driven output connected with the other support arm for moving the article in the other support arm from the other station toward the second position over the conveyor.

12. A glassware handling and treating apparatus for operation between a glassware forming machine and a continuously moving conveyor having a moving surface on which the base of the glassware from the machine is received comprising: a rotatable mount positioned between the glassware forming machine and the conveyor and rotatable about an axis normal to the surface of the conveyor receiving the ware; a carrier connected with the rotatable mount and including a support arm engageable with a portion of the ware other than the base and thereby exposing the base; rotational drive means connected to the rotatable mount for rotating the mount, the carrier and a suspended ware between a carrying position adjacent the glassware forming machine and a discharge position over the conveyor surface receiving the ware; a first reciprocating motor controlled by the glassware forming machine and mounted below the carrying position between the glassware forming machine and the conveyor, the motor having an output rod reciprocated toward and away from the base of the ware when the ware is at the carrying position; and a spray head mounted on the output rod for reciprocation toward the base of the ware and directed toward the base of the ware at the carrying position.

13. Apparatus as defined in claim 4 wherein: a deadplate is located below the path and surrounding the motor means at the third position, the deadplate being provided with an annular seat on which the cup rests when the output member is retracted away from the path; and fluid scavenging means is provided having a port positioned in the deadplate to be exposed as the cup is moved away from the annular seat by the output member.

14. A glassware handling and treating apparatus as defined in claim 12 wherein a second reciprocating motor is supported by the rotatable mount and includes a reciprocating output member reciprocated in a direction normal to the axis of rotation of the mount; and the carrier is supported by the reciprocating output member.

15. The apparatus of claim 14 further including motor control means connected to the second reciprocating motor and responsive to the rotation of the mount for extending the reciprocating member and the carrier away from the mount at the carrying position and retracting the member and carrier at the discharge position.

16. A method of handling and treating newly formed ware comprising the steps of: removing the ware from a forming machine by engaging an upper portion of the ware and allowing the base portion of the ware to be freely suspended in a pendular condition; transferring the removed ware in the pendular condition from the forming machine to a continuously moving output conveyor; exposing the base portion of the removed ware to a treatment fluid as the ware is transferred in the pendular condition from the forming machine to the output conveyor by supporting the removed ware above a fluid dispensing head having a spray cup, raising the head toward the ware until the spray cup partially envelops the exposed base portion of the ware, dispensing the treatment fluid from the head toward the base portion of the supported ware and lowering the head until the base portion of the ware is spaced from the cup and free to move laterally of the head; depositing the ware on the output conveyor with the exposed base portion resting on the conveyor after exposing the base portion; and maintaining the removed ware suspended in the pendular condition during the steps of transferring and exposing and until the ware is deposited on the output conveyor.

17. A method of handling and treating as defined in claim 16 wherein the step of dispensing comprises spraying the treatment fluid in a finely atomized spray onto the base portion of the suspended ware.

18. A method of handling and treating as defined in claim 16 wherein: the step of exposing comprises dispensing treatment fluids toward the base portion of the supported ware from dispensing heads at spaced stations.

References Cited

UNITED STATES PATENTS

| | | | |
|---|---|---|---|
| 2,180,737 | 11/1939 | Hess | 65—69 |
| 2,556,469 | 6/1951 | Dahms | 65—351 |
| 2,953,483 | 9/1960 | Torok | 118—48 X |
| 3,249,200 | 5/1966 | Rowe | 65—260 X |
| 3,615,327 | 10/1971 | McLary | 65—60 |

ROBERT LINDSAY, Jr., Primary Examiner

U.S. Cl. X.R.

65—83, 260, 348; 117—124 A, 124 T; 118—48